United States Patent [19]
Lipowitz et al.

[11] Patent Number: 5,279,780
[45] Date of Patent: Jan. 18, 1994

[54] PREPARATION OF POLYCRYSTALLINE CERAMIC FIBERS

[75] Inventors: Jonathan Lipowitz; James A. Rabe, both of Midland, Mich.

[73] Assignee: Dow Corning Corporation, Midland, Mich.

[21] Appl. No.: 918,736

[22] Filed: Jul. 22, 1992

[51] Int. Cl.⁵ .............................. C04B 40/00
[52] U.S. Cl. ........................ 264/82; 264/29.2
[58] Field of Search .......... 264/29.2, 29.6, 65, 264/82

[56] References Cited

U.S. PATENT DOCUMENTS

| | | | |
|---|---|---|---|
| 4,080,415 | 3/1978 | Coppola et al. | 264/65 |
| 4,172,109 | 10/1979 | Smoak | 264/65 |
| 4,237,085 | 12/1980 | Smoak | 264/65 |
| 5,051,215 | 9/1991 | Rabe et al. | 264/29.2 |
| 5,071,600 | 12/1991 | Deleeuw et al. | 264/22 |
| 5,167,881 | 12/1992 | Atwell et al. | 264/22 |

*Primary Examiner*—Jan H. Silbaugh
*Assistant Examiner*—Christopher A. Fiorilla
*Attorney, Agent, or Firm*—Roger E. Gobrogge

[57] ABSTRACT

This invention relates to the preparation of polycrystalline silicon carbide fibers from ceramic fibers. The process involves heating the ceramic fiber in an environment containing a volatile sintering aid to a temperature sufficient to convert the ceramic fiber to the polycrystalline silicon carbide fiber.

19 Claims, No Drawings

PREPARATION OF POLYCRYSTALLINE CERAMIC FIBERS

BACKGROUND OF THE INVENTION

This invention relates to a method for the preparation of thermally stable, polycrystalline silicon carbide ceramic fibers. The method described herein comprises converting ceramic fibers to the polycrystalline silicon carbide fibers by heating the fibers in an environment comprising a volatile sintering aid. The resultant fibers exhibit excellent mechanical strength at high temperatures and, thus, are useful, for example, as reinforcements for plastic, ceramic or metal matrices or for the formation of products such as high temperature insulation. belting, gaskets and curtains.

Several methods for the production of silicon carbide fibers have been developed. For instance, it is known that organosilicon polymers may be spun into fibers, infusiblized (cured) to prevent melting and ceramified at elevated temperatures. Such a process is used commercially to produce NICALON ™ SiCO fibers and TYRANNO ™ SiCOTi fibers from polycarbosilane and titanium-modified polycarbosilane, respectively. This method, however does not produce high density polycrystalline fibers and it has been shown to introduce substantial amounts of oxygen into the fiber. When such fibers are heated to temperatures above 1300° C., the oxygen volatilizes as CO and/or SiO causing weight loss, porosity and decreased tensile strength.

Methods for the preparation of thermally stable, polycrystalline silicon carbide fibers are also known in the art. For instance, U.S. Pat. No. 5,071,600 describes a process for forming such fibers in which polycarbosilane resin is spun into a green fiber, treated with boron, infusibilized and pyrolyzed at a temperature in excess of 1600° C. under an inert atmosphere. It can be seen that the process of this reference is clearly different than that of the present invention in that the boron is incorporated at an early stage of the fiber formation process (e.g., before or during the cure) whereas the present invention describes incorporation at elevated temperatures during ceramification.

Smoak in U.S. Pat. No. 4,237,085 teaches the preparation of silicon carbide bodies by a process which comprises molding SiC powder and elemental carbon into the desired shape and heating the molded body in an atmosphere containing boron. The method and products of the reference, however, are clearly different than those taught herein.

The present inventors have now unexpectedly discovered that thermally stable, polycrystalline SiC fibers can be formed by the process of the present invention.

SUMMARY OF THE INVENTION

The present invention relates to a method for the preparation of thermally stable, polycrystalline silicon carbide fibers. The method comprises heating a ceramic fiber containing silicon and carbon in an environment comprising a volatile sintering aid at a temperature sufficient to convert the ceramic fiber to the polycrystalline silicon carbide fiber.

DETAILED DESCRIPTION OF THE INVENTION

The present invention is based on the unexpected discovery that ceramic fibers can be converted to polycrystalline silicon carbide fibers which retain their strength at elevated temperatures (e.g., in excess of 1400° C.) by heating the ceramic fibers in an atmosphere comprising a volatile sintering aid. This was particularly unexpected since the prior art teaches that heating ceramic fibers to elevated temperatures causes degradation of the fiber and loss of strength. It was also particularly unexpected since the prior art does not teach that volatile sintering aids can be incorporated in a fiber which has undergone ceramification. The present inventors have now discovered that boron can be incorporated into such ceramic fibers and that the boron is effective in limiting fiber grain growth and aiding in densification of the fiber.

The fibers resulting from the process of this invention are characterized as having at least 75% crystallinity, a density of at least about 2.9 gm/cc and a very low residual oxygen and/or nitrogen content. The fibers also have a small average crystallite size (e.g., less than about 1 micron), useful tensile strengths and high elastic modulus even after aging at elevated temperature (e.g., in excess of 1600° C.).

The process of the present invention essentially comprises heating a ceramic fiber in an environment comprising a volatile sintering aid at a temperature sufficient to convert the ceramic fiber to a polycrystalline silicon carbide fiber. The ceramic fibers used in this process are not critical and nearly any amorphous or microcrystalline fiber that contains the silicon and carbon necessary to form stoichiometric or carbon-rich silicon carbide fibers can be used.

The ceramic fibers used in the invention, therefore, contain silicon and carbon. In a preferred embodiment of the invention, the silicon and carbon are present in near stoichiometric or moderately carbon rich amounts. Other elements, however, can also be present. These include, for example oxygen, nitrogen, titanium, zirconium, chlorine, and any other elements which can either be volatilized out of the fiber during pyrolysis or remain in the fiber without affecting the integrity of the resultant fiber.

Oxygen is commonly found in many ceramic fibers in varying amounts (e.g., about 0.1 wt % up to about 25 wt %). If present, said oxygen generally volatilizes out of the fiber upon heating to temperatures above about 1300° C. in the form of either SiO or CO. The inventors herein have also discovered that when the ceramic fiber is silicon-rich (i.e., greater than a stoichiometric amount of silicon compared to carbon) the oxygen tends to leave as SiO so as to drive the fiber towards stoichiometric SiC. Similarly, when the ceramic fiber is carbon-rich (i.e., greater than a stoichiometric amount of carbon compared to silicon) the oxygen tends to leave as CO so as to drive the fiber towards stoichiometric SiC. Therefore, the fibers can be either silicon or carbon rich provided there is sufficient oxygen present to cause the desired stoichiometry modification. Notwithstanding this, however, the silicon content generally should not significantly exceed the sum of the carbon and oxygen contents on an atomic basis. If this occurs, the product may contain a substantial amount of excess silicon which can lead to excessive grain growth and loss of strength. Similarly, oxygen contents above about 25–30% should generally be avoided since the resultant product may have low char yields and high porosity.

If the ceramic fiber contains nitrogen, most of said nitrogen generally volatilizes out of the fiber upon heating to temperatures above about 1400° C. in the form of $N_2$. Thus, nitrogen does little to affect the Si-C stoichiometry of the fiber and it may be incorporated into the fibers of the invention as long as the above SiC stoichiometry can be maintained. It should be noted that some nitrogen may remain in the fiber as the nitride of the sintering aid (e.g., BN). The inventors herein postulate that this nitride may interfere with complete densification of the fiber.

Preferred fibers of the invention, therefore, contain at least silicon and carbon in near stoichiometric amounts or, alternatively, if oxygen is present the carbon content is approximately equal to the sum of the silicon and oxygen contents on an atomic percent basis. More carbon can be present if a product containing some excess carbon in addition to silicon carbide is desired. This can help stabilize the microstructure by inhibiting crystallite growth and it may improve densification. However, elastic modulus generally drops as the excess carbon level rises and, as such, excess carbon levels above about 10-15% are generally not used.

Examples of fibers useful herein, therefore, include those containing silicon, carbon and, optionally, oxygen, nitrogen titanium, zirconium, and other volatile or non-volatile elements which do not affect the resultant fibers. Such fibers include SiC. SiCO, SiCN, SiCON, SiCOTi, and the like.

Many of these fibers are known in the art and several are commercially available. These include silicon oxycarbide fibers with a diameter in the range of 10-20 micrometers manufactured by Nippon Carbon and sold under the trade name "Nicalon" (E.g., Ceramic Grade (CG), High Volume Resistivity (HVR), etc.) and silicon oxycarbide fibers containing titanium with a diameter in the range of 8-12 micrometers manufactured by Ube and sold under the tradename "Tyranno". Experimental fibers such as silicon oxycarbonitride fibers with a diameter in the range of about 6-10 micrometers produced by Textron and silicon oxycarbonitride fibers with a diameter in the range of about 10-15 micrometers produced by Dow Corning designated "MPDZ" are also known and useful herein.

Commercial fibers often contain a sizing to prevent their bonding together. Although not necessary for the process of this invention, it may be desirable to remove this sizing prior to heat treatment. This can be accomplished, for instance, by chemically dissolving the sizing or by merely heating the fiber to a temperature sufficient to remove the sizing.

Methods for manufacturing the above fibers are well known in the art. The most common approach generally comprises spinning organosilicon polymers (with or without ceramic powder additives) followed by infusibilization and pyrolysis. Alternative approaches, however, such as various sol-gel processing techniques, chemical vapor deposition techniques, and the like are also contemplated herein. These methods are described in numerous texts and literature references.

Fibers to be used in this process may be nearly any length and may be in nearly any form desired. Generally, the fibers are essentially continuous and are used as either single strands (of 1 or many filaments (tows)) or are aligned unidirectionally (e.g., tapes), woven as a 2-dimensional fabric or shaped as a 3-dimensional preform.

As noted above, most of the oxygen and/or nitrogen originally present in the fibers is generally volatilized when they are heated at temperatures above about 1400° C. in standard environments (e.g., inert atmospheres). This generally results in the fibers weakening. The inventors herein, however, have discovered that when these fibers are heated to similar temperatures in an environment comprising volatile sintering aids, they maintain their strength and they undergo a densification process which decreases porosity.

The sintering aids which are useful herein are those which have a significant vapor pressure at and above the temperature where diffusion into the substrate proceeds at a useful rate—generally about the temperature at which the substrate fiber begins to decompose or densify. For example, for SiCO ceramic fibers, this can be as low as about 1200° C. for slow temperature heating (ramp) rates (e.g., <1° C./min) or 1400°-1500° C. for heating rates of several degrees per minute or more. It is advantageous to have the volatile sintering aid present during the entire heat treatment subsequent to onset of substrate fiber decomposition or densification. However, it is also possible to hold the substrate fiber at a temperature at or above its decomposition or densification point in a sintering aid-containing atmosphere for a time sufficient to allow incorporation of sintering aid into the substrate fiber. The fiber may then be heated further in the absence of sintering aid vapor to complete the densification process.

Examples of sintering aids include compounds of iron, magnesium, lithium, beryllium, boron, aluminum, thorium, yttrium, lanthanum, cerium and various other metals. Many of these sintering aids are described in Negita, "Effective Sintering Aids for Silicon Carbide Ceramics: Reactivities of Silicon Carbide with Various Additives." 69 J. Am. Ceram. Soc. C-308 (1986). Other metal-containing sintering aids suggested by Negita might also be effective in the practice of this invention. Preferred sintering aids are selected from the group consisting of boron, boron-containing compounds, aluminum and aluminum-containing compounds. Boron and boron-containing compounds are generally more preferred with boron oxides such as $B_2O_3$ being most preferred. Mixtures of sintering aids may also be used.

The sintering aid is generally used by merely introducing it into the environment for pyrolysis in its volatile state. This can be accomplished, for example, by placing solid or liquid sintering aid in the furnace and allowing it to volatilize under the heat of the furnace. Alternatively, the sintering aid could be volatilized outside the furnace and introduced during heating. The volatile sintering aid could be used neat, it could be diluted in a carrier gas (e.g., inert gases such as argon, helium, etc.) or it could be added under a vacuum.

Generally, the time for exposure to the volatile sintering aid atmosphere is not critical so long as exposure continues at least until the desired densification is complete or until sufficient sintering aid has been incorporated in the fiber to produce densification during subsequent thermal treatment in the absence of additional volatile sintering aid.

The amount of sintering aid used is, likewise, generally not critical as long as crystallite growth and porosity are minimized and, thus, fiber strength remains acceptable. Generally, the resultant polycrystalline fibers have at least about 0.1% by weight sintering aid incorporated therein.

The ceramic fibers are heated in the environment comprising the sintering aid at a temperature sufficient to convert the ceramic fiber to polycrystalline fiber and allow for evolution of any material that is released during decomposition. This temperature is generally greater than about 1500° C., preferably in the range of about 1600°-2200° C., and most preferably in the range of about 1700°-2000° C. It should be noted that this temperature should also be at least equivalent to that expected in any subsequent processing and/or the final utility.

The rate at which the fibers are heated and the holding times (holds) at the maximum temperature are also not critical as long as they allow for diffusion of the sintering aid into the fiber and escape of volatile by-products. Heating rates in the range of about 1°-50° C./minute with either no hold or holding times up to several hours are generally used. The total thermal exposure of the fiber which is dependant on heating rate, maximum temperature and time at maximum temperature does, however, often affect fiber characteristics such as modulus and grain growth.

It should be noted that the above process describes the conversion of preformed ceramic fibers (e.g., from a commercial source) to polycrystalline silicon carbide fibers. It is also contemplated herein that the process of this invention could be incorporated in a standard fiber manufacturing approach wherein, for example, fibers are spun, cured, and pyrolyzed to the temperatures described herein with the volatile sintering aid present for at least the time period described above. This process could be run in batches or on a continuous production line.

The ceramic fibers which result from the process of this invention have at least 75% crystallinity and have a density of at least about 2.9 gm/cc, which represents at least about 90% of the theoretical density of SiC. They generally have tensile strengths greater than about 100 Ksi and often in excess of 200 Ksi. The fibers also have a relatively smooth surface structure and generally have an average grain size less than 1 micrometer, often less than 0.5 micrometers, and typically less than 0.2 micrometers. The fibers can have a wide variety of diameters depending on the original ceramic fiber with diameters in the range of 5-20 micrometer being the most common. Virtually all of the oxygen and/or nitrogen originally present in, or introduced into, the fibers is removed by the high temperature pyrolysis step, except for any nitrogen which may be converted to the nitride of the sintering aid.

The following non-limiting examples are included in order that one skilled in the art may more readily understand the invention.

EXAMPLE 1 (COMPARATIVE)

Several 3 inch long tows of Ceramic Grade NICALON TM fiber obtained from Nippon Carbon Company ($Si_1C_{1.35}O_{0.44}$) were desized by heating at 600° C. for 0.5 hours in air. The fibers were then placed on a sheet of Grafoil TM in a furnace and ramped up at 10° C./minute to 1800° C. with a 0.5 hr hold at 1200° C. and a 1 hour hold at 1800° C., all under 99.998% argon. The fiber lost 29.3% of its weight and was too weak and crumbly for tensile strength measurement. SEM examination showed filaments to have large-grained porous cross-sections and extremely large grained surfaces.

EXAMPLE 2

Several 3 inch long tows of the same Ceramic Grade NICALON TM fiber lot used in Example 1 were desized as in Example 1 and laid on a sheet of Grafoil TM inside a loosely closed graphite crucible which also contained 0.2-0.3 g of boron oxide ($B_2O_3$) in a small Grafoil TM dish. The fibers and boron oxide were heated in a furnace as in Example 1. The resultant fiber had lost 28.4 percent of its weight, but retained 181+/−50 ksi tensile strength. Fractography showed critical flaws to be small surface pits - sites of localized unusual degradation rather than widespread grain growth and porosity development. Elastic modulus was 59.3+/−3.1 Msi and density was >3.1 g/cc, both near expected values for polycrystalline SiC and well above those of the initial Nicalon fiber (26.3+/−0.7 Msi and 2.54 g/cc, respectively). SEM examination showed filaments to have fine grained, low porosity cross-sections that appeared uniform from surface to core. X-ray diffraction line broadening measurements showed the fiber to be Beta-SiC with average crystallite size <0.1 micrometer. Fiber surfaces were smooth having developed only a faint, small-scale texture.

EXAMPLE 3

Approximately 50 feet of the same Ceramic Grade NICALON TM fiber lot used in Example 1 was desized as in Example 1 and wound onto a collapsible spool made of Grafoil TM. The spool was heated with 0.301 g of boron oxide ($B_2O_3$) in the same manner as Example 2. This yielded 1.90 g of tow with a uniform shiny grayish appearance. The resultant fibers retained tensile strength of 211+/−69 ksi, elastic modulus of 64.4+/−4.1 Msi and density >3.1 g/cc. SEM examination showed dense fine grained uniform cross-sections. Tow strength was good, but weak spots at kinks (where laid across sharp edges on the collapsible spool) inhibited rewinding to another spool. The fiber had the following composition: Silicon—68.1 wt. %; carbon—31.5 wt. %: nitrogen—0.41 wt. %; oxygen—0.115 wt %: and boron—0.39+/−0.05 wt %.

These fibers were thermally aged by heating to 1600° C. under argon for 12 hours. The fibers had a weight loss of 0.61% and retained 83% of their tensile strength (176+/−49 ksi). The fibers were also thermally aged by heating to 1800° C. under argon for 12 hours. The fibers had a weight loss of 0.3% and retained 83% of their tensile strength (176+/−68 ksi)

EXAMPLE 4

A 3.5 inch diameter cylinder was created with 29.353 g of HVR NICALON TM cloth consisting of a single sheet of cloth wound 3 times. On this cloth was wound 5.46 g (75 feet) of Ceramic Grade NICALON TM fiber tow. The cloth/fiber was desized as in Example 1 and heated 0.501 g of boron oxide ($B_2O_3$) in the same manner as Example 2. The continuous fiber was easily rewound onto a conventional spool in its entirety, although tow strength was not as good as Example 3. SEM examination showed porous large grained cross-sections. The contained an average bulk boron concentration of 0.30+/−0.05 wt %.

Tows of fiber within the NICALON cloth appeared to have the same strength as the above fiber of this Example. The cloth remained flexible enough to be repeatedly rolled out flat and recoiled.

EXAMPLE 5

Approximately 50 feet of the Ceramic Grade NICALON TM fiber used in Example 1 was coiled loosely and heated with 0.72 g of boron oxide ($B_2O_3$) in the same manner as Example 2. The fiber matted together during treatment but was easily wound on a storage spool once separated. The resultant fibers had a dense fine grained cross-section and contained 2.66 wt % boron. They retained a tensile strength of 166+/−42 ksi and an elastic modulus of 48.7+/−5.2 Msi.

EXAMPLE 6

TYRANNO TRN-M1601 fiber ($Si_1C_{1.4}O_{0.7}Ti_{0.02}$) was desized and heated with boron oxide in the same manner as Example 2. The resultant fibers were shiny and nearly black with dense fine-grained cross-section. They retained tensile strength of 251+/−51 ksi and elastic modulus of 40.1+/−1.7 Msi.

EXAMPLE 7

TYRANNO Lox M fiber ($Si_1C_{1.4}O_{0.4}Ti_{0.02}$) was heated with boron oxide in the same manner as Example 2. The resultant fibers were shiny and nearly black with dense fine-grained cross-section. They retained tensile strength of 319+/−70 ksi and elastic modulus of 58 6+/−3.4 Msi.

EXAMPLE 8

An SiCO fiber made by the spinning, UV curing and pyrolysis of a siloxane polymer of the structure $ViMe_2SiO(MeViSiO)_xSiMe_2Vi$ (Vi=vinyl and Me=methyl) was heated with boron oxide in the same manner as Example 2. The resultant fibers had a dense fine-grained exterior with a grainy interior (probably due to lack of diffusion into these thicker fibers). Tensile strength was not tested because the fibers had matted together due to insufficient cure.

EXAMPLE 9

An SiCNO fiber made by the spinning, air curing and pyrolysis of a phenyl vinyl modified methylpolydisilylazane polymer (made by the process of U.S. Pat. No. 4,340,619) of the empirical structure ($Si_1C_{1.36}N_{0.58}O_{0.22}$) was heated with boron oxide in the same manner as Example 2. The resultant fiber had smooth exterior surfaces and small grain size, but the interior contained a considerable amount of small scale porosity. The fiber contained 31.8 wt % carbon and 2.41 wt % nitrogen and had a tensile strength of 77+/−23 Ksi and modulus of 23.1 Msi.

EXAMPLE 10 (COMPARATIVE)

An SiCNO fiber made by the spinning, curing and pyrolysis of hydridopolysilazane polymer (made by the process of U.S. Pat. No. 4,540,803) of the empirical structure ($Si_1C_{0.4}N_{0.92}O_{0.12}$) was heated with boron oxide in the same manner as Example 2. The resultant fiber was fragile and SEM examination showed a very porous, large-grained structure. Proper densification did not occur because the silicon content of the polymer was significantly greater than the sum of the carbon an oxygen contents on an atomic basis.

EXAMPLE 11

Several 3 inch long tows of the same Ceramic Grade NICALON TM fiber lot used in Example 1 were desized as in Example 1 and laid on a sheet of Grafoil TM inside a loosely closed graphite crucible which also contained 0.3 g of boron oxide ($B_2O_3$) in a small Grafoil TM dish. The fibers and boron oxide were then placed in a furnace and ramped up at 10° C./min to 1500° C. with a 0.5% hour hold at 1200° C. and a 2 hour hold at 1500° C. all under 99.998% argon. The resultant fiber had lost 25.9 percent of its weight, but retained 184+/−27 ksi tensile strength. Elastic modulus was 29.0±1.5 Msi. The fibers were then laid on a Grafoil TM sheet and placed in a furnace with no additional boron oxide present and ramped up at 10° C./min to 1800° C. with a 0.5 hour hold at 1200° C. and a 1 hour hold at 1800° C., all under 99.998% argon A 3.3% weight loss occurred during this process, but the tensile strength of the product fiber was 226±69 Ksi and its modulus had risen to 61.3±4.7 Msi. SEM examination showed a microstructure similar to that obtained with a 1-step treatment as described in Example 2.

That which is claimed is:

1. A process for the preparation of polycrystalline silicon carbide fibers comprising:
   heating an amorphous or microcrystalline ceramic fiber containing silicon and carbon in an environment comprising a volatile sintering aid at a temperature sufficient to convert the ceramic fiber to a polycrystalline silicon carbide fiber and for a time sufficient to allow incorporation of the sintering aid into the ceramic fiber.

2. The process of claim 1 wherein the ceramic fiber additionally contains elements selected from the group consisting of oxygen, nitrogen, titanium, zirconium and chlorine.

3. The process of claim 2 wherein the ceramic fiber comprises a material selected from the group consisting of SiC, SiCO, SiCN, SiCON, and SiCOTi.

4. The process of claim 3 wherein the ceramic fiber comprises silicon, carbon and oxygen.

5. The process of claim 4 wherein the carbon content is approximately equal to or greater than the sum of the silicon and oxygen contents on an atomic percent basis.

6. The process of claim 4 wherein the oxygen content is less than about 30 weight percent.

7. The process of claim 1 wherein the ceramic fiber is in a form selected from the group consisting of essentially continuous single strands, unidirectionally aligned strands, 2-dimensional woven fabric and shaped 3-dimensional preforms.

8. The process of claim 1 wherein the volatile sintering aid has a significant vapor pressure at and above the temperature at which the ceramic fiber begins to decompose or densify.

9. The process of claim 1 wherein the volatile sintering aid is selected from the group consisting of compounds of iron, magnesium, lithium, beryllium, boron, aluminum, thorium, yttrium, lanthanum and cerium.

10. The process of claim 1 wherein the volatile sintering aid is selected from the group consisting of boron, boron compounds, aluminum and aluminum compounds.

11. The process of claim 1 wherein the volatile sintering aid is a boron oxide.

12. The process of claim 1 wherein the temperature is greater than about 1500° C.

13. The process of claim 1 wherein the temperature is in the range of about 1600° to about 2200° C.

14. The process of claim 1 wherein the fiber is heated in an environment selected from the group consisting of an inert gas and vacuum.

15. The process of claim 1 wherein the volatile sintering aid is continuously present while the heating is at a temperature in excess of the fiber decomposition or densification temperature.

16. The process of claim 1 wherein the amorphous or microcrystalline ceramic fiber is heated at a temperature above its decomposition or densification point in the environment comprising the sintering aid for a time sufficient to allow incorporation of sintering aid into the fiber and then heated in the absence of additional sintering aid.

17. The process of claim 1 wherein at least about 0.1 weight % sintering aid is incorporated in the ceramic fiber.

18. The process of claim 1 wherein the ceramic fiber additionally contains oxygen and at least one element selected from the group consisting of titanium, zirconium and chlorine.

19. A process for preparing a ceramic fiber comprising spinning a preceramic polymer to form a green fiber, curing the green fiber, and pyrolyzing the green fiber, the improvement comprises:

the incorporation of a volatile sintering aid in the pyrolysis environment at a temperature in the range of about 1500°–2200° C. which is sufficient to convert the cured fiber to a polycrystalline ceramic fiber, and for a time sufficient to allow the sintering aid to diffuse into the fiber at said temperature.

* * * * *